Jan. 7, 1964 — H. P. KAMIDE — 3,117,212
ELECTRIC HEATING SYSTEMS
Filed Feb. 23, 1961 — 3 Sheets-Sheet 1

INVENTOR.
HARRIS P. KAMIDE
BY
ATTORNEY

*INVENTOR.*
HARRIS P. KAMIDE
BY
ATTORNEY

30 WATTS

57 WATTS

123 WATTS

315 WATTS

500 WATTS

900 WATTS

1260 WATTS

2000 WATTS

3-WIRE EDISON SOURCE 236 V. 1φ a.c.

OPEN CIRCUIT

INVENTOR.
HARRIS P. KAMIDE
BY
ATTORNEY

United States Patent Office 3,117,212
Patented Jan. 7, 1964

3,117,212
ELECTRIC HEATING SYSTEMS
Harris P. Kamide, Franklin Park, Ill., assignor to General Electric Company, a corporation of New York
Filed Feb. 23, 1961, Ser. No. 91,270
9 Claims. (Cl. 219—20)

The present invention relates to electric heating systems incorporated in electric heating appliances such as electric cooking ranges and more particularly relates to a heating unit circuit and control means in which simple and essentially non-mechanical components may be interchangeably connected to provide a multiplicity of wattage outputs from a conventional range heating unit.

It is common practice in the electric range art to provide for the usual cooking service, a resistance heater or hotplate having two resistance elements which may be connected in various ways across the usual single phase, 236 volts, three wire Edison power source. The control switches used with such a heating unit provide a selection of five wattage outputs ranging from "Hi" in which both of the heating units are connected in parallel across the 236 volts power lines to "Warm" in which the heating units are connected in series across one of the line conductors and the neutral conductor. A typical push button switch used conventionally for this purpose is disclosed in Andrews Patent 2,431,904, granted December 2, 1947, for "Push Button Switches" and assigned to applicant's assignee herein.

While this arrangement is entirely satisfactory, the present market is demanding a greater selection of heats; and the tendency toward the very high wattage heating units produces at the lowest end of the available wattages, a "warm" heat which is actually too high for some delicate cooking operations. Accordingly, there are available on the market, mechanical switching devices known popularly as "infinite heat controls" in which a cycling motor makes and breaks the circuit to the heating unit to establish a proportion of "on" to "off" time bringing about the desired net available wattage output. These devices are satisfactory in operation but because they are essentially mechanical in nature and call for the periodic making and breaking of a heavy wattage circuit may be of relatively short life.

It is, therefore, an object of the present invention to provide a heating element circuit and control means which will give a selection of eight wattage outputs to encompass all of the heat requirements for the usual domestic cooking services.

It is another object of the invention to provide a switch mechanism for connecting a small number of electrical components combinatively to effect a wide range of possible wattage outputs.

It is a further object of the invention to connect a pair of resistance heaters and a rectifier in a plurality of combinations to provide a range of wattage outputs from the heaters.

It is a still further object of the invention to provide a wattage control mechanism for a surface heating unit of an electric range in order to provide a diverse plurality of possible wattage outputs.

To accomplish these objects, the present invention employs a heating unit circuit having a first resistance heater, a second resistance heater and a power rectifier, with switch means operable to interconnect these components in specific combinations to provide a wide range of usable wattage outputs. Naturally, employing these three components across the various leads of a three-wire, single-phase alternating current source affords a great number of possible combinations. Of this great number, only a selected number have been shown herein to provide a wide gamut of outputs. To illustrate my principle, there has been shown a surface heating unit of the generally known coiled sheath type which through the use of its two coils generates a maximum of about 2000 watts. At present, the heating unit described utilizes only the two coils in a plurality of outputs ranging from a low of 128 watts to the full 2000 watts. Utilizing the same two coils, the present invention allows low wattage outputs of 30 watts or 57 watts and specific intermediate wattages not available with just the two resistances.

In a first embodiment of the invention, there has been provided a manually rotatable switch. The switch is of the type which includes a plurality of concentrically disposed stationary levels each of which includes aligned spaced contacts wired as required. A briding member or wiper is provided for each level and each is insulatedly mounted on the rotatable shaft. The shaft is designed to be rotated in step by step fashion so that the bridging member or wiper sequentially traverses the contacts of a level on manual manipulation of the shaft. Naturally, the shaft may be stopped at any contact and is designed to remain on that step until moved to another position.

In a second embodiment of the invention, there has been provided a push button set with a button for each of the eight position settings used and a button for the off-position. The switch mechanism is of the type shown in the Andrews patent previously cited. In this patent, each button on actuation manipulates a plurality of slides to accomplish complete various connections. To adapt the Andrews switch for use on the present invention would require minor revisions in the switch structure which would be obvious to one skilled in the art. The switch mechanism as adapted for use in this invention would, as does the cited patent, close contacts due to the relative movement of the slides.

Figure 1:
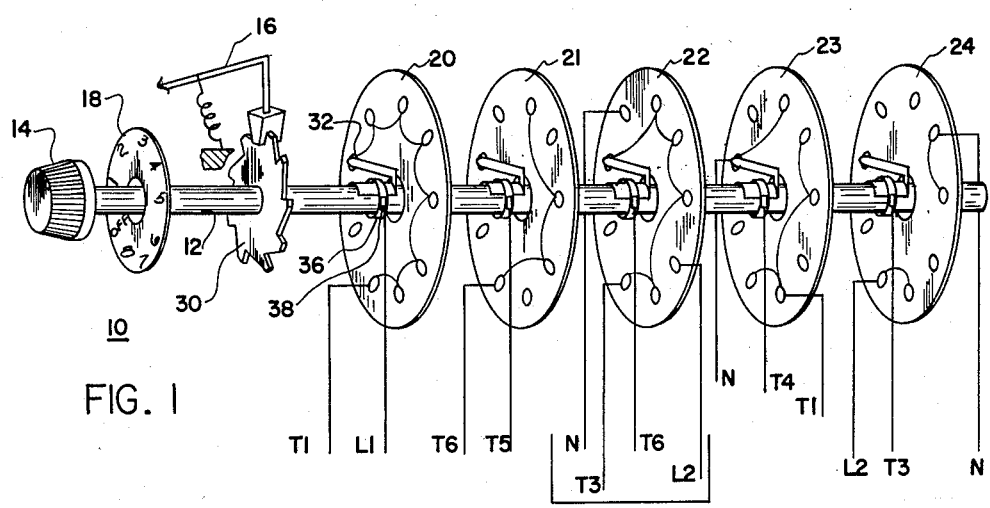
FIG. 1 shows a diagrammatic representation of a rotary switch that may be incorporated in a heating system embodying the present invention.

Referring now to FIG. 1 there is shown a multi-level rotary switch mechanism 10 which includes a central shaft 12 which is adapted to be rotated as a result of manual manipulation of control knob 14. The switch mechanism includes a plurality of a stationary contact bearing plates arranged concentrically about the shaft and past which the shaft is adapted to be rotated by suitable ratchet mechanisms such as 16 to nine discrete positions. As indicated on the stationary escutcheon plate 18, the nine positions include eight sequentially numbered positions and an off position; these nine positions being equiangularly spaced about the escutcheon plate. The escutcheon plate 18 and the circular plate levels numbered as 20, 21, 22, 23 and 24 respectively are all held stationarily by suitable means (not shown) while axial shaft 12 is rotated. This rotation is performed by the physical connection of shaft 12 to toothed cam wheel 30 which is rotated step by step by the ratchet mechanism 16.

On each of the stationary levels 21–24 there are nine equi-angularly spaced electrical contacts positioned concentrically about the level. Some of these contacts are commoned to other contacts on the level and others include a single outside connection, as will be more fully explained subsequently. Each level is equipped with a rotary wiper 30, 31, 32, 33 and 34 respectively and these wipers are firmly affixed to shaft 12 to rotate equi-angularly with the shaft to close the various circuits to the successive contacts at each position. Each rotary wiper blade is mounted to the shaft with a conductive ring 36 insulated from the shaft and connected to the wiper. A brush spring 38 may be stationarily mounted to the level plate to complete a connection from the contact on which the wiper is sitting through the wiper spring 32, conductive ring 36, brush spring 38, then to the external circuit L1 for the first level. This brush spring may be of any of the generally known types used with the slip ring constructions of electric motors or may be of the type used with the armature assembly of electromagnetic rotary stepping switches familiar to the computer and industrial control arts. In either of these well-known current transmitting examples, the brush spring includes a resilient stationary contactor adapted to maintain physical and electrical contact with a rotating conductive ring to transmit current thereto or therefrom.

Figure 2:
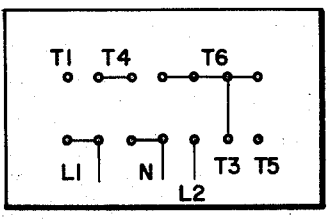
FIGS. 2–10 show diagrammatically the circuit closures for each of the positions from Off to High heat when using the push button embodiment.
Figure 8:
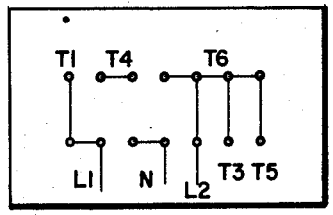
Figure 4:
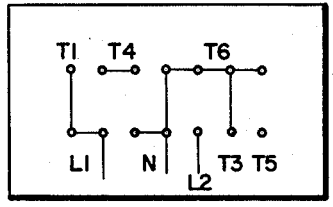
Figure 9:
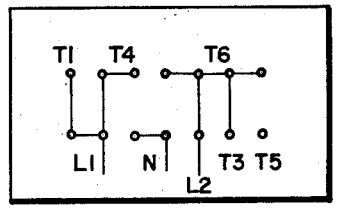
Figure 10:
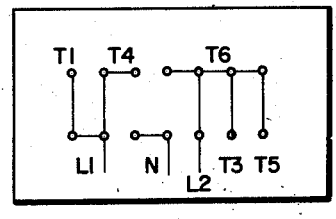

For the second embodiment employing push buttons, there is shown in FIGS. 2–10, the circuit closures for each of the positions ranging from the Off position in FIG. 2 to the maximum heat position of FIG. 10.

Figure 20:
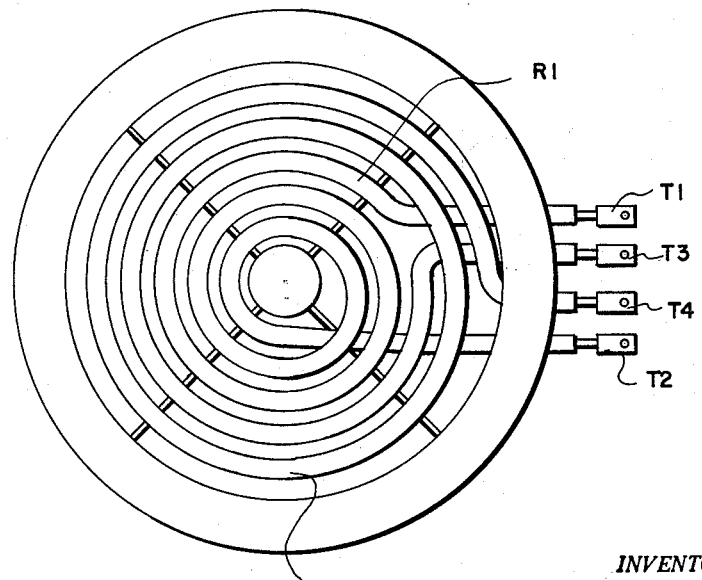
FIG. 20 shows a top plan view of a two coil resistance heater of the type exemplified herein.
Figure 19:
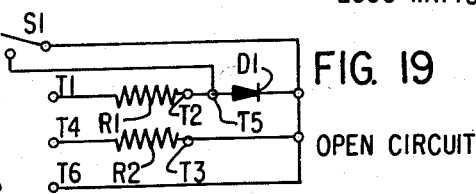
FIG. 19 shows the circuit components in the Off or open circuit position thereof.

In both of these embodiments, the specific circuit closures will connect the components shown in FIG. 19 to the voltage source leads in the various combinations. The components include a first resistor R1 which preferably could be a sheathed resistance heater of any known type with terminals T1 and T2 at either end of the resistance conductor. In the example used herein with a maximum output of 2000 watts, resistor R1 may be the inner coil of a concentric coiled heating unit of the type shown in FIG. 20. The resistance heater R1 in this example would have a resistance of approximately 50 ohms. Resistor R2 in this example would be the outer concentric coil with a resistance of approximately 42.5 ohms. Resistor R2 has connected to each of its resistance conductor ends suitable terminals T3 and T4. The other component shown in FIG. 19 is a rectifier D1 which has sufficient power carrying capacity for use herein. A typical solid state rectifier which will serve this purpose is G.E. diode 1N2158 with 400 volts peak inverse voltage rating and 25 ampere capacity. This rectifier is shown connected in series with resistor R1, terminal T2 of the resistance conductor being permanently connected to rectifier terminal T5. The other lead from the rectifier is connected to a terminal T6, and the closure of contacts T5 to T6 is shown as shunting contacts S1. This shunt, although shown as a seperate switch, need not be such and may be an integral part of the switching mechanism employed. When the shunting contacts short terminal T5 to terminal T6, rectifier D1 is shunted out of the system and has no effect. With contacts S1 open, rectifier D1 serves to rectify the voltage applied to it and to reduce the power transmitted through it to one fourth of the amount transmitted by the analogous non-rectified circuit.

The leads L1, N and L2 of FIG. 19 are the conventional conductors leading to a 236 volt, single-phase, three-wire Edison alternating current source. Connection of a load across leads L1 and L2 provides an R.M.S. voltage of 236 volts to the load while connection across leads L1 to N or L2 to N provides 118 volts to the load. As mentioned previously, by connecting these present circuit components in each of a number of combinations across the various conductors of the three-wire source, a great number of different wattage outputs can be attained.

Referring now to FIG. 2, there is shown the push button switch terminal connections with the circuit in its off position. No cross circuits are closed from the lower bank of contacts to the upper bank of contacts and no wattage output is generated. In the rotary switch embodiment of FIG. 1, the off position as shown on the escutcheon plate appears at approximately the eight o'clock position and all circuits are open in that position.

Figure 3:
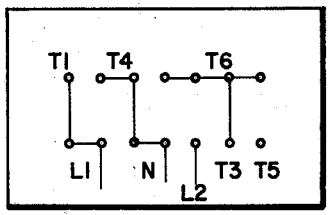
Figure 11:
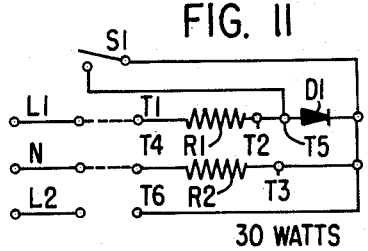
FIGS. 11–18 show individually the circuit configurations for each of the positions successively from low heat to high heat using the push button embodiment.

To set the embodiment of FIG. 1 to the first position the knob 14 is turned clockwise until wiper 32 rests against the first contact, this being the circuit closure position actually shown in FIG. 1. On level 20, source lead L1 is closed to resistor lead T1 through brush spring 38, ring 36, wiper 32, first contact and the level multiple to lead T1. On level 21, no circuit is closed. On level 22, lead T6 is closed to lead T3 over an obvious path. On level 23, lead T4 is closed to lead N and on level 24, no circuits are closed. This closure pattern provides the circuit configuration shown in FIG. 11. In this circuit configuration, the two resistors R1 and R2 are connected in series with rectifier D1 across the 118 volt source and the shunting switch remains open. This circuit configuration provides the lowest possible wattage output attainable with these components. In FIG. 3 is shown the push button closure pattern to provide the same low wattage output circuit configuration as shown in FIGS. 1 and 11. Using the stated parameters for resistance and voltage, the wattage output in this first position is approximately 31 watts. The calculation for this result may be completed as follows:

$$E_{average} = \frac{E_{R.M.S.}}{.707} \times .637 = \frac{118 \text{ v.}}{.707} \times .637 = 106.3$$

$$E_{rectified} = \frac{E_{ave.}}{2} = \frac{106.3 \text{ v.}}{2} = 53.1 \text{ v.}$$

$$\text{Power} = EI = \frac{E^2}{R} = \frac{53.1 \text{ v.} \times 53.1 \text{ v.}}{(50 \text{ ohms} + 42.5 \text{ ohms})} = 30.4 \text{ w.}$$

The wattage output in this position is, as mentioned, the lowest which can be attained using the present values and effectively can be used for warming plates and the like by maintaining a quite low output temperature. (The calculations shown herein are considered correct in principle and generally correct within rounding off limitations, and assuming no losses through the rectifier.)

The next higher wattage output which is used is one which provides a wattage output practically double that of the first position. In this second position, only the inner resistance heating element R1 is energized across the 118 volt source leads, and the voltage applied is rectified. The output wattage attained by this circuit configuration is approximately 56 watts (using the previously discussed parameters). To achieve this output employing the embodiment of FIG. 1:

At level 20, lead L1 is connected to lead T1.
At level 21, no connections are made.
At level 22, lead T6 is connected to lead N.
At levels 23 and 24, no connections are made.

Figure 12:
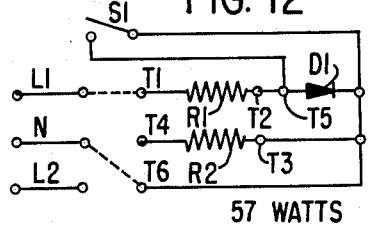

These connections complete the circuit of FIG. 12. By the push button embodiment of FIG. 4, these same connections are made to complete the required circuit.

Figure 13:
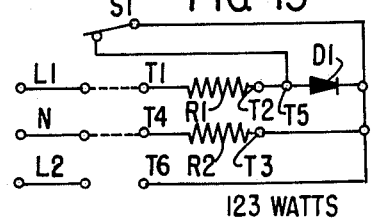

The next circuit configuration (position #3) employs both resistive elements connected in series across the unrectified 118 volt source. This circuit produces an output wattage four times that of position #1 amounting to an output of approximately 122 watts. To complete the circuit (FIG. 13) required for this wattage, the connections necessary in the embodiment of FIG. 1 are as follows:

At level 20, lead L1 is connected to lead T1.
At level 21, lead T6 is closed to lead T5.
At level 22, lead T6 is also connected to lead T3.
At level 23, lead T4 is connected to lead N.

Figure 5:
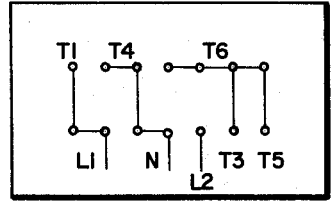

With the push button embodiment of FIG. 5, a like circuit can also be completed as can readily be seen.

The next wattage attained at position #4 is a wattage in the range of 315 watts which is achieved by connecting the rectified resistance of resistor R1 in parallel with the non-rectified resistance of resistor R2 across the 118 volt source. To complete the connections necessary for the circuit of FIG. 14, the connections in FIG. 1 include:

At level 20, lead L1 is connected to lead T1.
No connections at level 21.
At level 22, lead T6 is closed to lead T3.
At level 23, lead T4 is closed to lead T1.
At level 24, lead T3 is closed to lead N.

Figure 6:
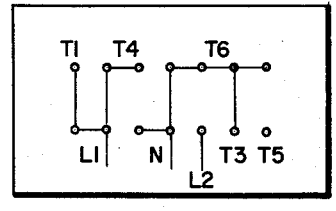
Figure 14:
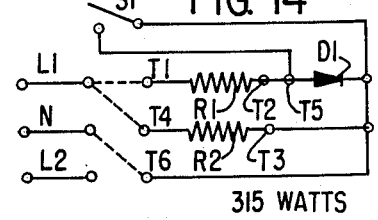

It should be noted that in this circuit configuration, FIG. 6 shows the analogous completed connection of the push button embodiment in a slightly different manner than FIG. 14 in that both leads T1 and T4 are commonly connected to lead L1, and lead T6 is commonly connected to leads T3 and N. The net effect of both circuits, however, it can readily be seen, is identical. The wattage calculations for the circuit of FIG. 14 (position #4) may be as follows:

Assuming a perfect rectifier with no resistance in direction of current flow and infinite resistance with reversed current flow, then $$\text{For } R_2 = P = \frac{E^2_{ave.}}{R} = \frac{106 \times 106}{42.5} = 260 \text{ watts}$$

$$\text{For } R_1 = E_{ave.} \text{ For } \tfrac{1}{2} \text{ wave} = \frac{E_{ave.}}{2} \text{ for full wave}$$

$$\text{Then } P = \frac{E^2_{ave.}}{R} = \frac{(E_{ave.})^2}{4} \times \frac{1}{R} = \frac{(106)^2}{4 \times 50} = 54 \text{ watts}$$

$$P_{R_1} + P_{R_2} = 260 + 54 = 314 \text{ watts}$$

Figure 15:
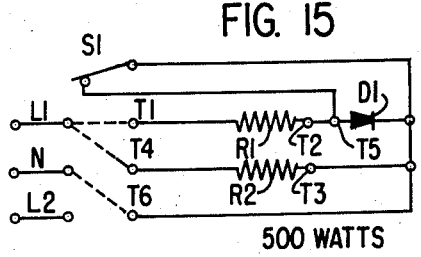

At the next position, position #5, the wattage required is achieved by using both resistance elements, unrectified and connected across the 118 volts source. The output at this position is on the order of 500 watts based on the circuit of FIG. 15. The connections in FIG. 1 necessary for this circuit are as follows:

On level 20, lead L1 is closed to lead T1.
On level 21, lead T5 is closed to lead T6.
On level 22, lead T6 is closed to lead T3.
On level 23, lead T4 is closed to lead T1.
On level 24, lead T3 is closed to lead N.

Figure 7:
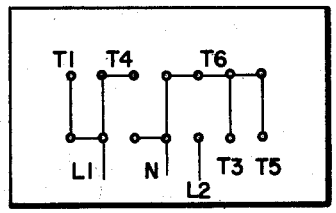

The push button equivalent of this circuit is shown in FIG. 7 in which the same circuit is completed with both resistances in parallel across the 118 volt leads and with rectifier D1 shorted out.

Figure 16:
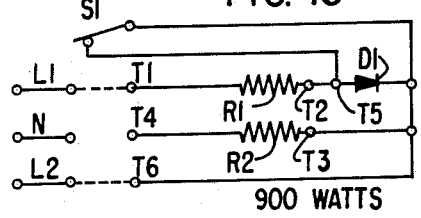

The next higher wattage output, that of position #6, is that attained by connecting resistor R1 across the 236 volt leads and with rectifier D1 shorted out. The output so attained is in the range of 900 watts. The connections necessary for this wattage output can be seen on FIG. 1 as follows to complete the circuit of FIG. 16:

On level 20, lead L1 is closed to lead T1.
On level 21, lead T5 is closed to lead T6.
On level 22, lead T6 is closed to lead L2 and on levels 23 and 24 no circuits are made.

The equivalent of this circuit using the push button embodiment is shown in FIG. 8.

Figure 17:
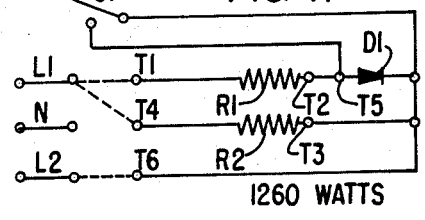

The wattage output at the next position, position #7, is in the range of 1250 watts and is attained by placing both resistors in parallel across the 236 volt leads and rectifying the current through resistance element R1. The wattage output of this circuit is approximately four times that achieved by having the same circuit connected across 118 volts as employed in FIG. 14. This conclusion can readily be appreciated by viewing the power formula $$P = \frac{E^2}{R}$$

thus when E is doubled and R remains constant, the power is quadrupled. To complete the circuit of FIG. 17, the connections in FIG. 1 must be made as follows:

At level 20, lead L1 is closed to lead T1.
At level 21, no circuit is closed.
At level 22, lead T6 is closed to lead T3.
At level 23, lead T4 is closed to lead T1, and
At level 24 lead T3 is closed to lead L2.

The equivalent connections of FIG. 9 close a like circuit in the push button embodiment.

Figure 18:
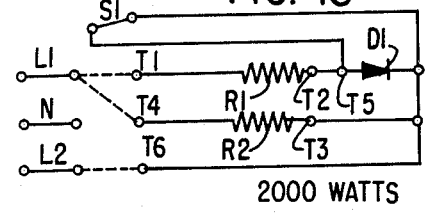

The high wattage output in the final position, position #8, is achieved by placing both resistance elements in parallel across the full 236 volt source and shunting out the rectifier D1. A full wattage output of about 2,000 watts can be attained in this manner. The circuit to achieve this full wattage, FIG. 18, is achieved by the following connections on the FIG. 1 embodiment:

At level 20, lead L1 is closed to lead T1.
At level 21, lead T6 is closed to lead T5.
At level 22, lead T6 is closed to lead T3.
At level 23, lead T4 is closed to lead T1, and
At level 24, lead T3 is closed to lead L2.

The equivalent of these connections in the push button embodiment is attained by the use of the connections of FIG. 10.

By the use of these components, a range of wattage outputs including 30, 60, 125, 315, 500, 900, 1250 and 2000 can be achieved. (All wattages are approximations.) As mentioned previously, many other outputs could be attained but it is felt that those shown constitute the wattage outputs of most general application to provide a well-spaced series of possible outputs. It can also be readily seen that the principle employed herein could be utilized in instances where a single resistance heater or multiple resistance element heaters are used. In any event, use of rectification will result in a greater diversity of outputs than is attained with the resistances alone.

It should be further noted that in utilizing the stepping switch embodiment, suitable generally known spark suppression means would most generally be employed to protect the switch contacts from erosion. Such means have not been shown as these are not germane to the claimed invention and would be quite obvious to one skilled in electronic arts.

While there has been described what is at present thought to be the preferred embodiments of the invention, it will be understood that various modifications may be made therein and it is intended to cover in the appended claims all such modifications as fall within the true spirit and scope of the invention.

What is claimed is:
1. In an electric heating system;
   a unitary electric switch including a manually operable multi-position controller, three input terminals, three output terminals, a pair of switch contacts,
   and mechanism selectively governed by the different positions of said controller for selectively interconnecting a plurality of different combinations of two of said three input terminals and a plurality of different combinations of either two or three of said three output terminals and for selectively actuating said switch contacts between positions of engagement and disengagement with respect to each other;
   a three-wire Edison source of A.-C. electric power including a pair of outside line conductors and a neutral line conductor respectively connected to said three input terminals;
   a first electric heater and a diode bridged in series relation with each other across first and second of said output terminals;
   a second electric heater bridged across said second output terminal and a third of said output terminals;
   a first connection between one of said switch contacts and the junction between said first heater and said diode;
   and a second connection between the other of said switch contacts and said second output terminal.
2. In an electric heating system;
   a unitary electric switch including a manually operable multi-position controller, three input terminals, three output terminals, a pair of switch contacts, and mechanism selectively governed by the different positions of said controller for selectively interconnecting a plurality of different combinations of two of said three input terminals and a plurality of different combinations of two of said three output terminals and for selectively actuating said switch contacts between positions of engagement and disengagement with respect to each other;

a three-wire Edison source of A.-C. electric power including a pair of outside line conductors and a neutral line conductor respectively connected to said three input terminals;

a first electric heater and a diode bridged in series relation with each other across first and second of said output terminals;

a second electric heater bridged across said second output terminal and a third of said output terminals;

a first connection between one of said switch contacts and the junction between said first heater and said diode;

and a second connection between the other of said switch contacts and said second output terminal.

3. In an electric heating system;

a unitary electric switch including a manually operable multi-position controller, three input terminals, three output terminals, a pair of switch contacts, and mechanism selectively governed by the different positions of said controller for selectively interconnecting a plurality of different combinations of two of said three input terminals and a plurality of different combinations of three of said three output terminals and for selectively actuating said switch contacts between positions of engagement and disengagement with respect to each other;

a three-wire Edison source of A.-C. electric power including a pair of outside line conductors and a neutral line conductor respectively connected to said three input terminals;

a first electric heater and a diode bridged in series relation with each other across first and second of said output terminals;

a second electric heater bridged across said second output terminal and a third of said output terminals;

a first connection between one of said switch contacts and the junction between said first heater and said diode;

and a second connection between the other of said switch contacts and said second output terminal.

4. In an electric heating system;

a unitary electric switch including a manually operable multi-position controller, two input terminals, three output terminals, a pair of switch contacts, and mechanism selectively governed by the different positions of said controller for selectively connecting said two input terminals and a plurality of different combinations of either two or three of said three output terminals and for selectively actuating said switch contacts between positions of engagement and disengagement with respect to each other;

a source of A.-C. electric power including two line conductors respectively connected to said two input terminals;

a first electric heater and a diode bridged in series relation with each other across first and second of said output terminals;

a second electric heater bridged across said second output terminal and a third of said output terminals;

a first connection between one of said switch contacts and the junction between said first heater and said diode;

and a second connection between the other of said switch contacts and said second output terminal.

5. In an electric heating system;

a unitary electric switch including a manually operable multi-position controller, two input terminals, three output terminals, a pair of switch contacts, and mechanism selectively governed by the different positions of said controller for selectively connecting said two input terminals and a plurality of different combinations of two of said three output terminals and for selectively actuating said switch contacts between positions of engagement and disengagement with respect to each other;

a source of A.-C. electric power including two line conductors respectively connected to said two input terminals;

a first electric heater and a diode bridged in series relation with each other across first and second of said output terminals;

a second electric heater bridged across said second output terminal and a third of said output terminals;

a first connection between one of said switch contacts and the junction between said first heater and said diode;

and a second connection between the other of said switch contacts and said second output terminal.

6. The electric heating system set forth in claim 5, wherein said electric switch essentially comprises a rotary switch and said controller essentially comprises a rotary knob.

7. The electric heating system set forth in claim 5, wherein said electric switch essentially comprises a push button switch and said controller essentially comprises a plurality of individual push buttons.

8. The electric heating system set forth in claim 5, wherein said diode essentially comprises a solid state rectifier.

9. The electric heating system set forth in claim 5, wherein said first and second heaters are secured together to form a unified hotplate.

References Cited in the file of this patent

UNITED STATES PATENTS

| 2,705,276 | Wise | Mar. 29, 1955 |
| 2,806,120 | Deas | Sept. 10, 1957 |